J. HERSCHMAN.
Roach-Trap.
No. 222,134. Patented Dec. 2, 1879.
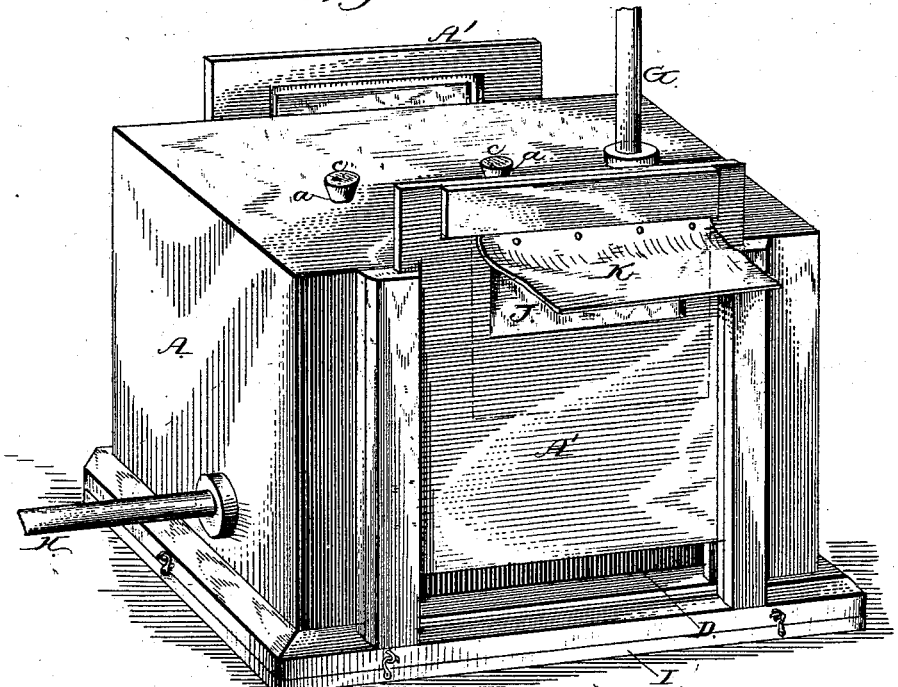
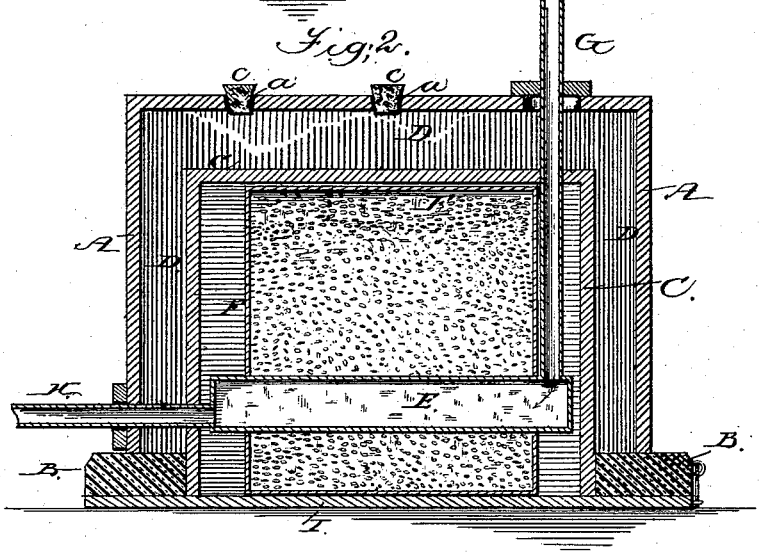

UNITED STATES PATENT OFFICE.

JOSEF HERSCHMAN, OF NEW YORK, N. Y.

IMPROVEMENT IN ROACH-TRAPS.

Specification forming part of Letters Patent No. 222,134, dated December 2, 1879; application filed September 25, 1879.

*To all whom it may concern:*

Be it known that I, JOSEF HERSCHMAN, of New York city, county, and State, have invented a certain new and Improved Roach-Trap; and I do hereby declare the following to be a full, clear, and exact description of the same, reference being had to the accompanying drawings, forming part of this specification, in which—

Figure 1 is a perspective view of the trap, showing the sliding doors partially opened. Fig. 2 is a longitudinal vertical section of the same.

Similar letters of reference in the several figures denote the same parts.

My invention has for its object to provide an improved trap for catching roaches or other similar vermin; and It consists, primarily, of a box or receptacle having suitable openings or entrances for the roaches, and a heating apparatus for raising the temperature in the box above that of the outside atmosphere.

It further consists in the combination of two cases or shells having a space between them with an apparatus for heating the air in said space; and it consists, lastly, in a trap as a whole, constructed and arranged substantially as I will now proceed to describe.

In the drawings, A represents an outer shell or case, constructed of wood, metal, or other suitable material, but preferably of wood, and resting upon and secured to a base, B. C is another case or shell, of the same general form as the shell A, but smaller, arranged within said shell A, and also secured to the base B, thus forming an inclosed space, D, between the shells, as clearly shown in Fig. 2.

The sides of the shell A are closed by sliding doors A'; but when the trap is set these doors are raised, so as to permit the entrance of the roaches into the space D, where a suitable bait is placed for their attraction.

The doors are provided with glazed windows J, to permit the inspection of the interior, and flexible curtains K are provided to keep the windows normally covered.

The upper edges or corners of the base B are preferably beveled off, so that access to the trap will be rendered more easy.

It is well known that roaches frequent the warmer rooms and closets, particularly if there be anything contained therein upon which to feed. I take advantage of this knowledge of their habits in the construction of my trap by raising the temperature in the space D above that of the room in which the trap is placed, and providing a bait within such space as an additional inducement for the entrance of the roaches.

The means which I preferably employ for raising the temperature in the space D consist of a hot-water receptacle, E, arranged within a box, F, containing gravel, or any other substance that will retain heat for a long time, the whole being arranged within the smaller shell, C, as shown in Fig. 2.

The receptacle E is supplied with hot water through a feed-pipe, G, extended up out of the top of the trap, and is provided with a discharge-pipe, H, by which to draw off the water when it becomes cooled and it is desired to introduce a fresh supply.

The gravel in the box F imparts its heat slowly to the walls of the shell C, thus raising the temperature in the space D. I preferably line the interior of the shell C with sheet metal, for better transmitting the heat, and also to keep all the seams tight in said shell.

I do not, of course, desire to limit myself to this particular means for heating the space D, as it is obvious that many other plans might be adopted to effect the same result.

The bait which I preferably employ in the space D is sour apples or lager-beer sprinkled on the walls of said space, or contained in a sponge or sponges placed in said space. These I have tried and found very effective.

There are, however, many other substances that would perhaps answer equally well, and perhaps better.

Apertures *a*, fitted with corks *c*, are provided in the case A, to permit the introduction of the bait in the upper part of the space D.

When the trap is set in a cool room the bait might be dispensed with entirely, the natural inclination of the roaches to seek refuge in a warm place being sufficient to secure a large attendance. The trap is set with the sliding doors A' raised, and when a sufficient number have accumulated, which will be in a very short while where roaches are plentiful, the doors are shut down and the vermin afterward destroyed by suffocation, or otherwise, as desired.

A removable board, I, covers the whole bottom of the trap, as shown.

I claim as my invention—

1. In a trap for roaches or other similar vermin, the combination of a box or receptacle having suitable openings or entrances for the roaches with a heating apparatus for raising the temperature in said box above that of the outside atmosphere, substantially as described.

2. In a trap for roaches or other similar vermin, the combination of the two cases or shells A C, having the space between them, with a heating apparatus for raising the temperature in said space, substantially as described.

3. The combination of the shells A C with the sliding doors A', hot-water receptacle E, and box F, containing gravel, substantially as described.

JOSEF HERSCHMAN.

Witnesses:
S. WOLF,
W. BLACKSTOCK.